United States Patent
Liu et al.

(10) Patent No.: US 11,298,691 B2
(45) Date of Patent: Apr. 12, 2022

(54) PRUSSIAN BLUE DERIVED CATALYSTS

(71) Applicant: UCHICAGO ARGONNE, LLC, Chicago, IL (US)

(72) Inventors: Di-Jia Liu, Elmhurst, IL (US); Hao Wang, Darien, IL (US)

(73) Assignee: UChicago Argonne, LLC, Chicago, IL (US)

( * ) Notice: Subject to any disclaimer, the term of this patent is extended or adjusted under 35 U.S.C. 154(b) by 97 days.

(21) Appl. No.: 16/279,383

(22) Filed: Feb. 19, 2019

(65) Prior Publication Data
US 2020/0261893 A1 Aug. 20, 2020

(51) Int. Cl.
*B01J 27/26* (2006.01)
*B01J 35/10* (2006.01)
*B01J 37/08* (2006.01)
*B01J 37/00* (2006.01)

(52) U.S. Cl.
CPC .......... *B01J 27/26* (2013.01); *B01J 35/1014* (2013.01); *B01J 35/1019* (2013.01); *B01J 37/0036* (2013.01); *B01J 37/08* (2013.01); *B01J 2523/17* (2013.01); *B01J 2523/27* (2013.01); *B01J 2523/37* (2013.01); *B01J 2523/39* (2013.01); *B01J 2523/72* (2013.01); *B01J 2523/842* (2013.01); *B01J 2523/845* (2013.01); *B01J 2523/847* (2013.01)

(58) Field of Classification Search
None
See application file for complete search history.

(56) References Cited

U.S. PATENT DOCUMENTS

2011/0039176 A1* 2/2011 Patolsky ............... H01M 4/90
429/428

OTHER PUBLICATIONS

Blasco-Ahicart, et al., "Polyoxometalate electrocatalysts based on earth-abundant metals for efficient water oxidation in acidic media," Nature Chemistry 10, pp. 24-30 (2018).
Carmo, et al., "A comprehensive review on PEM water electrolysis," International Journal of Hydrogen Energy 38(12), pp. 4901-4934 (2013).
Chong, et al., "Investigation of Oxygen Reduction Activity of Catalysts Derived from Co and Co/Zn Methyl-Imidazolate Frameworks in Proton Exchange Membrane Fuel Cells," ChemElectroChem 3(10), pp. 1541-1545 (2016).
Clynne, et al., "'Hot Water' in Lassen Volcanic National Park—Fumaroles, Steaming Ground, and Boiling Mudpots," U.S. Geological Survey and the National Park Service—Our Volcanic Public Lands, USGS Fact Sheet 101-02, 4 pages (2003).

(Continued)

*Primary Examiner* — Wyatt P McConnell
(74) *Attorney, Agent, or Firm* — Foley & Lardner LLP

(57) ABSTRACT

Prussian blue analog derived catalysts having a composition of highly porous transition metal ("TM") oxides with nano particle size. Such OER catalysts are synthesized from the PBA, containing cobalt, iron, nickel, copper, manganese, zinc, magnesium etc., as secondary building units ("SBUs") coordinated by hexacyano-based ligands. Furthermore, the PBA-derived catalysts may also integrated into a highly graphitized carbon network to further improve the conductivity, mass transport and durability against oxidative corrosion.

19 Claims, 11 Drawing Sheets

(56) References Cited

OTHER PUBLICATIONS

Han, et al., "Formation of Prussian-Blue-Analog Nanocages via a Direct Etching Method and their Conversion into Ni—Co-Mixed Oxide for Enhanced Oxygen Evolution," Advanced Materials 28(23), pp. 4601-4605 (2016).

Ma, et al., "Cobalt Imidazolate Framework as Precursor for Oxygen Reduction Reaction Electrocatalysts," Chemistry: A European Journal 17(7), pp. 2063-2067 (2011).

Mondschein, et al., "Crystalline Cobalt Oxide Films for Sustained Electrocatalytic Oxygen Evolution under Strongly Acidic Conditions," Chemistry of Materials 29(3), pp. 950-957 (2017).

Rodriguez-Garcia, et al., "Cobalt hexacyanoferrate supported on Sb-doped SnO2 as a non-noble catalyst for oxygen evolution in acidic medium," Sustainable Energy & Fuels 2, pp. 589-597 (2018).

Yang, et al., "Highly acid-durable carbon coated Co3O4 nanoarrays as efficient oxygen evolution electrocatalysts," Nano Energy 25, pp. 42-50 (2016).

Zhao, et al., "Highly Efficient Non-Precious Metal Electrocatalysts Prepared from One-Pot Synthesized Zeolitic Imidazolate Frameworks," Advanced Materials 26(7), pp. 1093-1097 (2014).

Zhao, et al., "Iron imidazolate framework as precursor for electrocatalysts in polymer electrolyte membrane fuel cells," Chemical Science 3, pp. 3200-3205 (2012).

Zhao, et al., "Highly Active, Durable Dispersed Iridium Nanocatalysts for PEM Water Electrolyzers," Journal of the Electrochemical Society 165(2), pp. F82-F89 (2018).

"Molecule of the Week Archive: Prussian blue," American Chemical Society, retrieved from https://www.acs.org/content/acs/en/molecule-of-the-week/archive/p/prussian-blue.html, 4 pages (2017).

Hurlbutt, et al., "Prussian Blue Analogs as Battery Materials," Joule 2(10), pp. 1950-1960 (2018).

Munoz & Martinez, "Prussian Blue Based Batteries," SpringerBriefs in Applied Sciences and Technology, 108 pages (2018).

Nie, et al., "Prussian blue analogues: a new class of anode materials for lithium ion batteries," Journal of Materials Chemistry A 2, pp. 5852-5857 (2014) (accepted manuscript provided).

Wang, et al., "Prussian Blue Analogs for Rechargeable Batteries," iScience 3, pp. 110-133 (2018).

Xu, et al., "Prussian blue and its derivatives as electrode materials for electrochemical energy storage," Energy Storage Materials 9, pp. 11-30 (2017) (accepted manuscript provided).

\* cited by examiner

PRUSSIAN BLUE DERIVED CATALYSTS

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to catalysts, specifically for catalysts active for water splitting in hydrogen and oxygen production, such as in a proton-exchange membrane ("PEM") fuel cell.

BACKGROUND

Hydrogen has been considered as one of the most promising energy carriers as it can be burned to generate heat or reacted with air in fuel cells to generate electricity with water as the only byproduct. However, hydrogen does not purely exist in nature, and its production relies on energy input. Therefore, the viability of hydrogen-based energy generation is very much dependent on the efficiency of the mechanisms available to produce hydrogen as a feedstock.

Among the means of hydrogen production, low temperature water electrolysis represents one of the critical technologies as it produces clean hydrogen with quick response and excellent integration with the renewable sources. Low temperature electrolysis can be operated by using either proton exchange (acidic) or anion exchange (alkaline) membranes. The low temperature membrane electrolyzers offer advantages of higher current density (above 2 A/cm$^2$) and higher H$_2$ purity, rendering them a preferred technology when high energy efficiency and low footprint are essential (see, e.g., "A comprehensive review on PEM water electrolysis", Marcelo Carmo, David L. Fritz, Jürgen Mergel, Detlef Stolten, International Journal of Hydrogen Energy, 38 (2013) 4901).

Water electrolyzer can operate using either alkaline or acidic membranes. For alkaline electrolyzer, the electrochemical reactions anode and cathode are the following:

$$\text{Anode:} 2OH^- \rightarrow \tfrac{1}{2}O_2 + H_2O + 2e^- \quad (1)$$

$$\text{Cathode:} 2H_2O + 2e^- \rightarrow H_2 + 2OH^- \quad (2)$$

For acidic or proton exchange membrane electrolyzer, the electrochemical reactions anode and cathode are the following;

$$\text{Anode:} H_2O \rightarrow 2H^+ + \tfrac{1}{2}O_2 + 2e^- \quad (3)$$

$$\text{Cathode:} 2H^+ + 2e^- \rightarrow H_2 \quad (4)$$

Particularly at anode where the oxygen evolution reaction ("OER") takes place, working in the oxidative environment under high polarization voltage, however, adds substantial demand to the electrode catalyst and the support. The situation is even worse when the reaction occurs in corrosive acidic media, resulting in limited choice of materials that would perform under such harsh conditions.

In order to operate in such an environment and provide acceptable levels of performance, platinum group metal ("PGM") materials are currently being used, such as iridium black. Ir shows extremely high OER catalytic performance in both acidic and alkaline media. However, Ir is also the lowest abundance in the Earth's crust even among PGM. At present, there are two major challenges of the OER catalyst for low temperature electrolyzer. Therefore, current methods and catalysts are limited by a high cost hurdle and limited reserve of PGM hold back the large-scale implementation of polymer electrolyzer in the renewable energy landscape.

As to the first barrier, cost, currently used OER catalysts are PGM-based ones, including Ir and Ru, with the natural reserves even less than that of Pt. The utilization of PGM will significantly increase the cost hurdle of PEM electrolyzers, preventing them from large-scale implementation. The PGM-free catalysts developed so far, such as low-cost transition metal oxides (spinels, perovskites, etc), are applicable in alkaline or neutral media, but unsuitable in acidic media because of the dissolving issue. Furthermore, they are generally not sufficiently conductive which impede the electrolyzer efficiency.

Thus, low-cost and Earth-abundant OER catalysts (e.g., transition metal oxides) can only meet the requirement for alkaline or neutral media, but none of them can fulfill the technological requirements in acidic media so far.

The second is the catalyst support stability. Ideally, the catalyst should be dispersed over high surface and conductive support to improve its usage and enhance the charge-transfer properties. Conventionally, amorphous carbon black ("CB") as the catalyst support has excellent conductivity but cannot be used in low temperature electrolyzer. CB is composed of nanosized carbon particles, characterized by a weakly aligned, highly defective turbostratic surface. The electrical conduction is achieved through electron percolation between individual CB particles. Under the OER potential, the carbon particles will shrink by oxidation which interrupts such percolation, leading to increased electrode impedance and eventual shutdown of catalysis. Highly graphitized carbon should be evaluated for PEM electrolyzer as alternatives to amorphous CB because the graphitized carbon with sp$^2$-hybridization is more charge conductive and stable against corrosion, and its network ensures the connectivity with individual catalyst particle.

SUMMARY

Embodiments described herein relate generally to a method of making a catalyst material. Prussian blue analogue having at least one metal is prepared and mechanically processed with graphitized carbon in an organic solvent to form a Prussian blue analogue and graphitized carbon (PBA/GC) material. A thermolysis treatment is applied to the PBA/GC material and a PBA derived metal oxide catalyst material is formed.

In another embodiment, a method of making a catalyst material comprises mechanically processing Prussian blue analogue comprising at least one metal with graphitized carbon in an organic solvent. The result is dried to form a Prussian blue analogue graphitized carbon material. Metal oxide is formed on the Prussian blue analogue graphitized carbon material. The result is thermolyzed in an oxidizing environment forming a PBA derived metal oxide catalyst material having particle sizes of about 20-40 nm.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
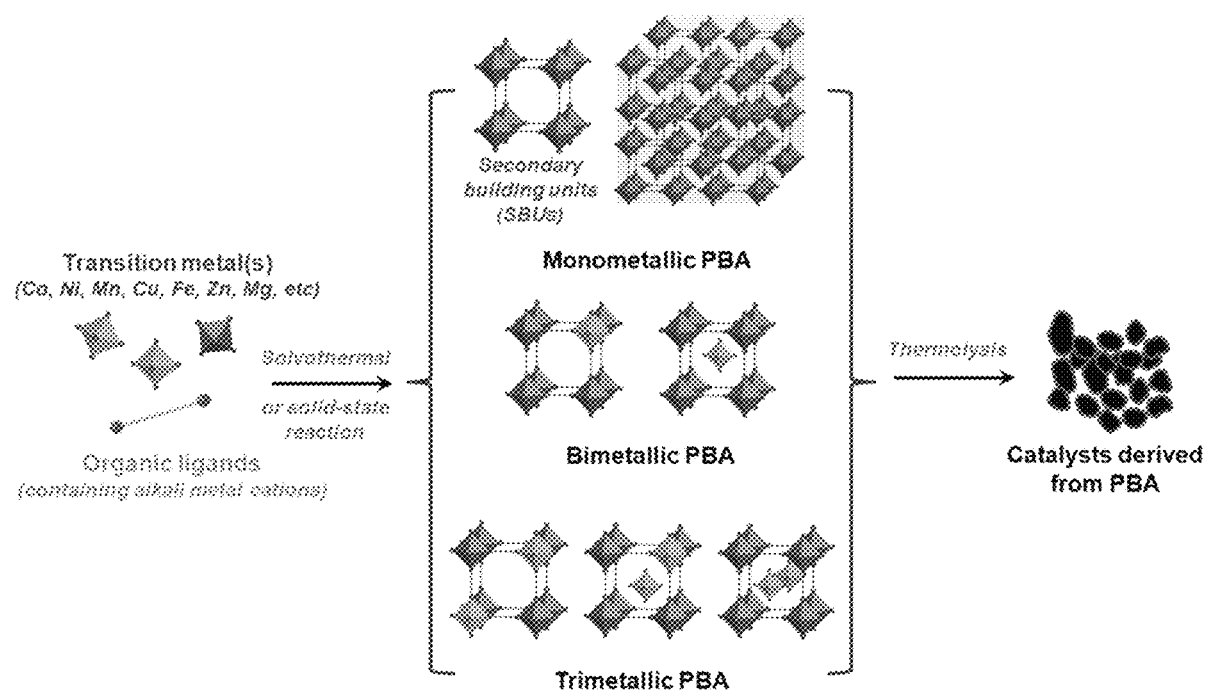
FIG. 1 shows schematics of synthesis of monometallic, bimetallic and trimetallic prussian blue analogues ("PBAs") and PBAs-derived oxide catalysts.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to a PBA-derived nano catalyst. In certain embodiments, it deals with the application in electrolyzer for water splitting in hydrogen/oxygen production. Described herein are methods for producing a nano-sized PBA-derived oxide wrapped by highly graphitized carbon as a synergistic catalyst for high-efficiency and durable PGM-free OER electrocatalysis in PEM electrolyzer. The PBA-derived catalysts have the composition of highly porous transition metal ("TM") oxides with nano particle size. Such OER catalysts are synthesized from the PBA, containing cobalt, iron, nickel, copper, manganese, zinc, magnesium etc, as secondary building units ("SBUs") coordinated by hexacyano-based ligands. Furthermore, the PBA-derived catalysts are also integrated into a highly graphitized carbon network to further improve the conductivity, mass transport and durability against oxidative corrosion. The PBA-derived catalysts are low-cost, highly active toward acidic OER, with excellent conductivity yet resistant to the oxidation under high potential. Examples are included herein illustrating the activity and durability of certain experimental samples of PBA-derived catalysts evaluated by the RDE method and half-cell in the electrolyte.

One embodiment relates to a new class of PGM-free OER catalyst for low temperature PEM electrolyzer application. Such OER catalysts are synthesized from monometallic, bimetallic, ortrimetallicnano-sized PBAs containing a transition metal as the metal center or SBUs (FIG. 1) coordinated by hexacyano-based organic ligands. Such SBUs may comprise metals such as cobalt, iron, manganese, nickel, copper, and zinc, lanthanide and actinide. Alternatively, the OER catalyst can be formed by infiltrating soluble transition metal into such PBAs. For such OER catalysts, the infiltrated transition metal may comprise the same set of metals as for the SBU pathway. The transition metals are present as metal oxides. The catalysts have high BET specific surface areas within the range of 60-150 $m^2/g$ and have the composition of highly porous (with pore size approximately within 2-50 nm) yet highly stable TM oxides. Thus, formed, the OER catalyst have porous electrode architecture with active sites exposed maximumly, facilitating mass transport properties. The activity and durability of the new catalysts are evaluated by the RDE, half-cell and electrolyzer method in acidic media.

In one embodiment, the catalyst is doped with alkali metal ions. The organic ligand used in the catalyst synthesis includes alkali metalcations. Thus, alkali metals exist from the start of PBA formation and remain through the whole post treatment processes. Most transition metal oxides are charge isolators. In contrast, alkali metal dopants improve the conductivity of pure transition metal oxides. The presence of the alkali metals accelerates charge transfer properties and giving rise to fast catalytic onset response. The alkali metals present in the charged state and are either trapped within the pore or bound within the lattice structure.

In one embodiment, the transition metal oxides present in the catalyst with a particle size ranging from 10-30 nm. The relatively small particle sizes benefit from the precise control of the solvothermal conditions, so that the coordination between TM and organic ligands is tunable. The small size particles ensure high exposure of active sites that could maximally participate in OER electrocatalysis, resulting in high current density and high turnover frequency.

Once PBAs are formed, they may undergo a drying process for collection. The drying process is preferably controlled since small particles tend to agglomerate when they are being dried. The crystallite size control by crystallization in the dilute TM salt-ligand solution or through mechanical grinding, such as planetary ball-milling or through the combination of both, can be generally applied to a variety of organic-inorganic coordination materials and are known to the skilled in the arts. Such facile mechanosynthesis enables organic-inorganic ligations uniformly distributed through the material framework and meanwhile breaks down the particle size into nano scale. Thus, in one embodiment the dried PBAs may be further processed to reduce the particle size, for example through planetary ball-milling. Small particle sizes with excellent dispersion in the electrode architecture correlate with high exposure of active sites for acidic OER electrocatalysis, giving rise to high intrinsic activity.

The dried PBA's may then undergo thermolysis in oxidizing environment, as shown in FIG. 1, resulting in PBA-derived catalysts. During the thermolysis, the majority of the organic components such as C and N were mostly removed through oxidation. The transition metal in PBAs combines with oxygen to form transition metal oxide while maintaining the initial framework structure of PBAs, thus forming porous metal oxide with higher porosity and surface area than the conventional metal oxide with similar chemical composition. The initial chemical composition and lattice structure of PBAs therefore are altered after the thermolysis. The OER catalyst thus formed has the feature of porous PBA derived metal oxide, or PMO.

While, TM oxides have been investigated as OER catalysts for decades, at high proton concentrations, catalytic performance of TM oxides becomes insufficient and dissolution becomes a major issue. Nanostructured TM oxides in some cases may sustain acceptable current density, but still can only last for a short period of time. Conventionally used carbon support in alkaline or neutral OER cases is amorphous with high surface area. Such amorphous materials are no longer suitable in acidic OER as they cannot sustain the oxidative potential before being oxidized to $CO_2$.

One embodiment relates to nano oxide wrapped by highly graphitized carbon ("GC") with high OER durability, for example graphene. As discussed above, mono-, bi-, and tri-metallic PBA can be synthesized through solvothermal or solid-state reaction processes. Rather than directly thermolyze the PBA to form a PBA-derived catalyst, the PBA may be combined with a carbon material, for example GC, resulting in PBA/GC. This embodiment results in a catalyst derived from PBA/GC, with the GC providing a "protection" for the catalytic sites in certain environments. This is particular beneficial in certain acid OER applications. The graphitized carbon provides stability to the catalyst even in the acidic OER environment. It is expected that the GC protects the TM oxide from being dissolved and meanwhile narrowing the charge-transfer resistance. As a result, the catalytic material includes at least two phases, the oxide and the graphitized carbon.

The hybrid material is prepared by ball milling a mixture containing suspended PBAmicrocrystallites and GC. GC includes, but is not limited to graphite, graphene, carbon nanotube, graphene oxide, reduced graphene oxide, boron- or nitrogen-doped nanodiamond etc. During pyrolysis, the embedded PBA is converted into porous TM oxide protected by GC, which is robust against corrosion-induced degradation since the network will maintain connected through the carbon even if the surface is being partially oxidized. The water and $O_2$ transport to/from the active sites readily through void with less resistance than the bulk catalyst, improving catalyst utilization and reducing mass-transport overpotential. The excellent connectivity of carbon/TM oxide would also minimize the charge-transfer resistance. All these factors will lead to a better electrolysis efficiency and durability.

One embodiment relates to PBA@GCcoated by Group IV metal oxides through atomic layer deposition ("ALD") to further enhance OER durability. Group IV metal oxides include, but not limited to, titanium oxides, zirconium oxides, hafnium oxides, etc. These oxides are highly stable in acidic medium, thus preventing both carbon layer and oxide catalysts from corrosion and oxidation. Group IV metal chlorides or alkoxides (such as ethoxides and isopropoxides) can serve as ALD precursors, and the thickness of Group IV metal oxide layer can be controlled through altering depositing cycles. The following thermal treatment of Group IV metal oxide-coated PBA@GC can help crystallize Group IV metal oxides and meanwhile generate channels for mass transport.

During the PBAs synthesis, one, two or three different transition metal ions maybe used together to form mono-metallic, bimetallic and trimetallic PBAs in which the SBUs are the mixture of one, two or three different type of transition metals. Alternatively, PBAs can be synthesized using one kind of metal ion while the second and third metal can be added in the form of metal salt or complex in the PBA cavity encapsulated during the PBAs synthesis or added through infusion after PBAs synthesis. The PBAs thus prepared will be mixed with graphitized carbon through ball-milling to form a homogeneous slurry. In such mixture, the PBA nanoparticles and graphitized are suspended in the solution. The slurry is subsequently dried to solid powers, which are ready for thermal activation.

One embodiment relates to choice of GC over amorphous carbon as TM oxide protection. As mentioned above, ideally, the catalyst should be dispersed over high surface and conductive support to improve its usage and enhance the charge-transfer properties. Amorphous carbon black (CB), under the OER potential, will shrink by oxidation which interrupts such percolation, leading to increased electrode impedance and eventual shutdown of catalysis. GC should be evaluated for PEM electrolyzer as alternatives to amorphous CB because GC contains high level of sp2-hybridization, leading to higher charge conductivity and better stability against corrosion. GC network also ensures the connectivity with individual catalyst particle. As an example, graphene is a perfect candidate for catalyst support due to its large surface area and highly graphitized carbon structures for fast charge transfer. Even during the catalyst thermal activation process, graphene structure is still well maintained, giving rise to strong interactions between the catalyst and the support.

The process of preparing PBA-derived catalysts or metal oxide catalysts, for water splitting includes the following steps:

Step 1: Preparing Monometallic or Bimetallic or Trimetallic PBA Based Precursors.

The preparation of monometallic PBAs of different structures and compositions uses solvothermal method or solid-state synthesis. According to one embodiment, the transition metals used to prepare the monometallic PBA are those having catalytic activity for water splitting, including but not limited to cobalt, nickel, iron, copper, manganese, zinc etc. Typically, the salts of these transition metals used for PBA precursor fabrication are nitrate, acetate, chloride and sulfate. The examples of the transition metal salts include, but not limited to, $Co(NO_3)_2$, $Co(OAc)_2$, $Ni(NO_3)_2$, $Ni(OAc)_2$, $FeCl_2$, $Fe(OAc)_2$, FePc, $Fe(NO_3)_3 \cdot 9H_2O$, $Mn(OAc)_2$ etc. For solvothermal reaction, the concentration of the metal solution typical ranges from 0.1-1.0 mol/L, and more preferably, the concentration of the metal solution ranges from 0.3-0.4 mol/L. For the organic ligand solution preparation, the organic ligand is dissolved into organic solvent. In the preferred embodiment, the organic ligands according to one embodiment are hexacyano-based, such as potassium hexacyanoferrate (III) and potassium hexacyanocobaltate (III). The carbon and nitrogen atoms can serve as the multidentate ligation sites to coordinate with the transition metal in forming PBAs. The concentration of the ligand in the solution is generally determined by the stoichiometric ratio to the metal content in the solution and the final composition of the PBA materials. For example, if the final ratio of metal to ligand in the PBA structure is 1:2, then the molar concentration of the ligand in the solution should be twice of that of the metal in the final mixture after the metal and ligand solutions are mixed.

The preparation of bimetallic PBAs precursors is realized by adding the second transition metal to the PBA of the first transition metal through solvothermal synthesis or solid-state synthesis. The salt of the second transition metal will be used. Typically, the second transition metal that can either coordinate with hexacyano-based organic ligands or incorporate is selected. The synthesis of bimetallic PBA can be synergic or sequential. For the synergic synthesis, both first and second metal salts are mixed together in solution before reacting with the ligand. The amount of organic ligand needed is determined by the stoichiometric ratio of the total amount of the first and second transition metal. For sequential synthesis, the bimetallic PBA is prepared by two separate stages. In the first stage, a monometallic PBA is prepared. The PBA thus prepared is subsequently mixed with the second transition metal salt in solid state, followed by a ball milling method. The second metal is thus uniformly mixed with the first transition metal PBA by partial exchanging the first transition metal in the PBA's lattice structure, or doped over the surface and inside of the cavity of first PBAmicrocrystallites. The secondary metal can be either located on the framework or capsuled in the pore of primary metal PBA (FIG. 1). In a preferred embodiment, the molar ratio of the first transition metal salt to the second metal salt should be in the range of 50:50 to 95:5. In the more preferred embodiment, the said molar ratio should be in the range of 70:30 to 90:10. The organic ligand for the preparation of the bimetallic PBA should be the same as said ligands for the preparation of the monometallic PBA.

The preparation of trimetallic transition metals PBA through solvothermal synthesis or solid-state synthesis. Typically, the third salt of the transition metal which is added using the similar method used to synthesis the bimetallic transition metal PBA as abovementioned. The tertiary metal also can be either located on the framework or capsuled in the pore of primary metal PBA (FIG. 1). The molar ratio of the first transition metal salt to the second metal salt to the third metal salt should be in the range of 50:25:25 to 70:25:5. In the more preferred embodiment, the said molar ratio should be in the range of 70:15:15 to 85:10:5.

Step 2: Ballmilling.

Figure 2:
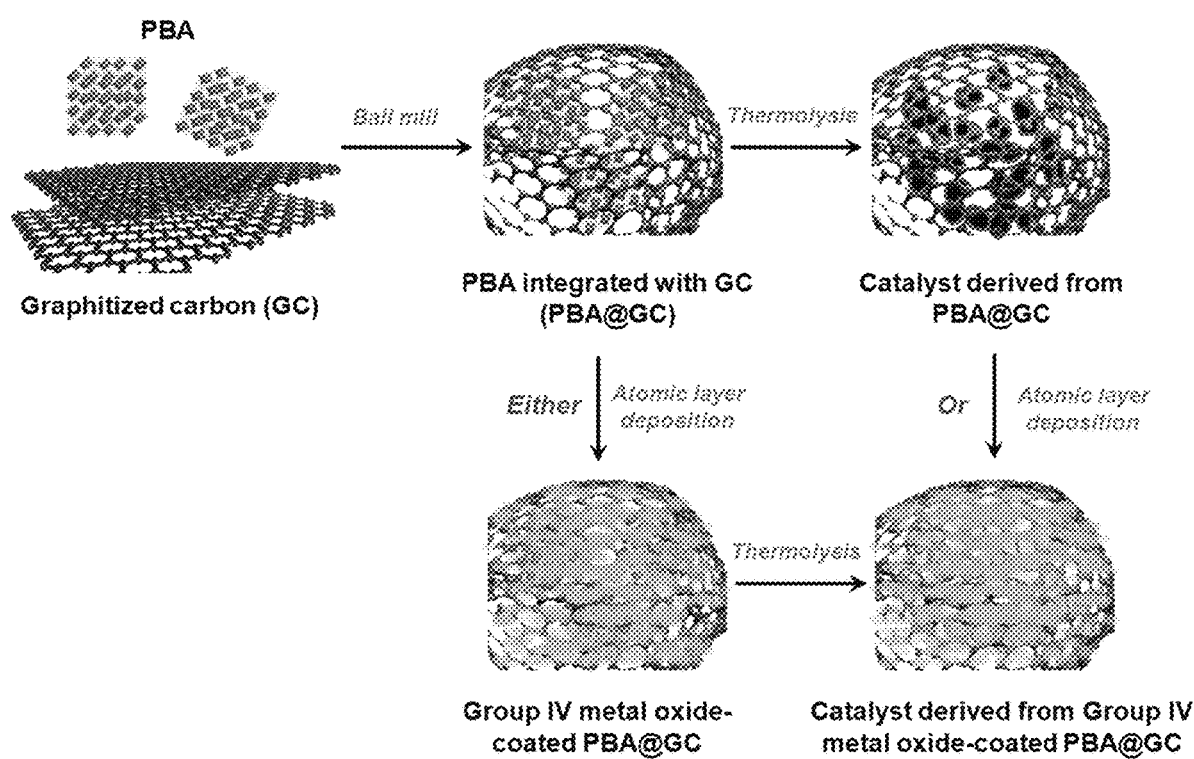
FIG. 2 shows schematics of synthesis of PBA-derived oxide catalyst integrated with graphitized carbon through ball milling, followed by thermolysis, with or without Group IV metal oxide coatings by atomic layer deposition.

The monometallic, bimetallic and trimetallicPBAs produced from Step 1 will be subjected to a mechnical breadkdown, such as grinding or ballmilling, to be integrated with GC as is shown by the schematics in FIG. 2. The grinding or ballmilling helps to break down the larger PBA crystallites or crystallite agglomerates to small and more uniformed PBA crystallites without destroying its crystal structure. In such process, the PBAs, such as from step 1 above, will be first mixed with the GC and dispersed in organic solvents through ultrasonication to form a uniform suspension. The solvent is for dissolving the transition metal and ligand precursors to induce the coordination bonds, known as the nucleation process. The crystal nucleus grow up until the microcrystallite clusters precipitate from the mother liquor, eventually suspending in the solution. The solvent includes, but is not limited to, methanol, ethanol, dimethylformamide ("DMF"), and water. GC includes, but is not limited to graphite, graphene, carbon nanotubes, graphene oxide, reduced graphene oxide, boron- or nitrogen-doped nanodiamond, etc. For instance, oxidized GC provide initial landing sites for the further ALD precursors; or GC with N dopants shows higher electronic conductivity than unfunctionized GC. The suspension is the ground to a completely homogeneous slurry. In one embodiment, the grinding is accomplished by transfer into a ballmill container for planetary ballmilling. Such treatment serves the following purposes: (a) optimizing the ratio between PBA and GC as the final product by controlling the amount of PBA over the GC, and the PBA/GC mass ratio is in the range of 50/1-1/1 (in a preferred embodiment, the ratio ranges from 30/1-15/1); (b) uniform dispersing of the transition metal in the catalyst through PBA-GC mixing, therefore reducing metal agglomeration during high temperature treatment in the following step; (c) increasing surface area for high exposure of active sites and increasing porosity for mass transport properties; and (d) increasing connectivity of individual catalytic site benefited from sufficient contact between PBA and GC for charge transfer purposes.

Optional Step 3: ALD.

In some cases, atomic layer deposition was conducted for further Group IV metal oxide protection over GC surface. Coating protection could also be realized through other deposition techniques, include but not limited to chemical vapor deposition (CVD), metal oxide CVD (MOCVD), plasma enhanced CVD (PECVD), sputtering, or e-beam evaporation. Considering even highly graphitized carbon will still be oxidized under both oxidative and acidic environments, this treatment will further protect the GC surface from corrosion by introducing Group IV metal oxides on GC surface through ALD. Group IV metal (such as titanium, zirconium and hafnium) oxides are stable against oxidation and high concentration of proton, and some of the oxides (e.g., $TiO_2$, $ZrO2$, $HfO2$) aid in OER electrocatalysts by reducing water oxidation energy barriers. Suitable ALD metal precursors include but not limited to metal chlorides and metal alkoxides. Prior to ALD, ultrahigh purity inert gas (N2 or Ar) is used as carrier gas. The Group IV metal oxide is doposited within a temperature range of 373-573 K using alternating exposure to metal precursors and deionized water. The time sequence for one cycle (precursor-inert gas-water-inert gas) is adjustable with 30-200-4-200 s as an example. The Group IV metal oxide layer should be fairly thin and atomically covering the catalyst surface. The subsequent thermal activation could generate channels for electrolyte contacting with oxide active sites without deteriorating the catalytic activity during the reaction.

ALD processes often comprise two half-reactions, whereby precursor materials for each half-reaction are kept separated throughout the coating process. ALD material growth is based on self-limiting surface reactions, which makes achieving atomic scale deposition control possible. In a first half-reaction, a precursor gas is introduced to a substrate surface and produces a first monolayer. Excess or unreacted species and/or reaction by-product from the first half-reaction may be purged from the substrate surface by flow of inert gas (i.e., nitrogen, argon, etc.), vacuum evacuation, or other similar removal techniques. A second precursor of gas is then introduced to the substrate surface and reacts with the first monolayer to produce a monolayer on the substrate surface (i.e., the surface of the plurality of nanoparticles). Excess or unreacted species and/or reaction by-product from the second half-reaction may be purged from the deposition chamber using similar evacuation methods as used for the excess or unreacted species and/or reaction by-product from the first half-reaction.

Step 4: Thermolysis.

Once the PBA@GC powder is formed, the powder undergoes high temperature pyrolysis to be converted into GC-protected oxide catalysts for acidic OER electrocatalysis applications. The PBA@GC without or with Group IV metal oxide coating as produced according to the Step 2 or Step 3, respectively, will be subjected to high temperature treatment to form catalysts. Such treatment will oxidize the precursors into oxide-based materials under oxidative environment, such as air, oxygen and carbon dioxide, etc. This treatment serves one or more of the following purposes: (a) decomposing hexacyano-based organic ligands to form oxide active sites towards acidic OER, but leaving trace carbon and nitrogen residues (from organic ligands) that are uniformly doped into TM oxides to improve the activity; (b) improving the interaction between PBA-derived nanoparticles and GC to ensure an effective GC protection over the oxide particles to prevent TM oxides from dissolution and agglomeration through accelerated aging tests; or (c) forming TM oxide structure with high surface area and high porosity yet with excellent electric conductivity so that the charge can be more effectively transferred to and from the active site during the electrochemical reaction. The thermal treatment should be in oxidizing environments. Under such environment, the organic ligands in PBAs decompose while GC should be well remained. The metal will be oxidized to metal oxide while a trace fraction of the carbon and nitrogen will be doped into oxide particles. As demonstrated through the examples below, the catalysts according to one embodiment have a unique GC-protected nanomorphology, which enables effectively mass transport and interaction for both reactants and products, particularly when the reaction involving condensable moiety such as water.

The thermal conversion of the PBA@GC precursors is conducted in a controlled environment, such as a flow reactor surround by a heating element. In one embodiment, the treatment is carried out inside of a tubular reactor under a constant flow of carrier gas surrounded by temperature controlled furnace. The thermal conversion temperature typically ranges from 200° C. to 500° C. (more specifically, 300° C. to 400° C.), from one to four hours under the flow of oxidative environments. The thermolysis temperature and time should also be carefully controlled so that GC will be decomposed. The carrier gas should be oxidizing gas. The example of such oxidizing carrier gas includes, but are not limited to, air, $O_2$, oxygen-inert gas mixture, $CO_2$, etc. These gases have different oxidative capability therefore affecting the rate of oxide formation.

This high temperature pyrolysis converts the PBAs to highly stable yet porous oxide catalysts with redox activity towards oxygen. The high temperature treatment decomposes the organic ligands, but the selected GC should not be affected under such oxidized conditions, rendering the pyrolyzed catalysts highly porous and well connected. The key feature of such composite is that it maintains the nano sized particle morphology and meanwhile the particles get protected by GC as shown in TEM and carbon elemental mapping images. The GC protection should also slow down the oxidation process of the oxide materials, giving rise to possibly more than one oxidation state exist in TM oxides thus formed. For example, Co-PBA embedded in GC can be oxidized to cobalt oxide, such as CoO, $Co_2O_3$, and $Co_3O_4$. These porous metal oxides have unique morphologies and compositions with high specific surface area and high electric conductivity than their bulk oxide forms.

Optional Step 5: ALD.

As described for optional step 3, in some embodiments, atomic layer deposition is utilized to deposit Group IV metal oxide protection over GC surface. In these embodiments, the ALD deposition occurs after the thermolysis step (either without prior ALD via step 3 or in addition to). The Group IV metal oxide layer should be fairly thin and atomically covering the catalyst surface. The subsequent thermal activation would create channels within the layer to ensure the effective contact between electrolyte and oxide active sites without deteriorating the catalytic activity.

PEM Electrolyzer

There are less than no reports on PGM-free catalysts for acidic OER electrocatalysis, for real PEM electrolyzer applications. OER in acidic media is quite challenging due to the fact that very limited materials can sustain in both acidic and oxidative environments.

The described PBA-derived catalysts, in particular PBA/GC derived catalysts, provided a number of advantages, including the following: (a) the OER catalysts derived from the PBA-based nanofibers exist high surface area and uniformly distributed catalytic sites, thus the activities are significantly improved; (b) alkali metal dopants improve the intrinsic activity of TM oxides; (c) GC protection or Group IV metal oxide protection prevent the TM oxide from dissolution or agglomeration; (d) GC improves the connectivity of individual oxide particle and narrows down the charge transfer resistance. All the advantages enable the catalysts with not only enhanced activities, but also excellent stability when operated in acidic electrolyze for water splitting, which outperform the conventional OER catalyst and those of the prior arts.

In one application, the described PBA/GC derived catalyst is used as anodic catalyst in a PEM electrolyzer. The catalytic performance of the catalysts in this invention demonstrate promising acidic OER performance not only in RDE and half-cell, but also in PEM electrolyzer. The MEA made from the optimized catalyst shows a higher than 200 $mA/cm^2$ current density when the electrolyzer cell potential reaches 1.80V. PBA-derived OER catalysts are firstly dispersed in organic solvent in order to generate homogeneous ink. MEAs are preferentially prepared by air-brushing a catalyst-containing ink onto proton exchange membranes (Nafion). Airbrush offers flexibility of catalyst loading control. Catalyst/ionomer ratio, ranging from 5/1 to 1/1, has been optimized.

EXAMPLES

The process of preparing PBA-derived PGM-free PEM electrolyzer catalysts according to various embodiments described above can be further elucidated by the following non-limiting examples:

Example 1: Synthesis of a Monometallic PBA

Synthesis of PBA(Co): Typically, cobalt acetate tetrahydrate ($Co(CH_3COO)_2 \cdot 6H_2O$, 0.6080 g, 2.4 mmol) was dissolved in ethanol (40 ml) and water (40 ml). Then a solution of potassium hexacyanocobaltate (III) ($K_3Co(CN)_6$, 0.5488 g, 1.6 mmol) in water (40 ml) was added dropwise. The mixture was stirred at room temperature for 0.5 h and then was kept at room temperature for 24 h. The pink crystals were collected through centrifugation, and washed with water/ethanol (v./v.=2/1) for 3 times, before being vacuum dried at 80° C. overnight. After completely dried, the crystals in blue color were grinded manually in an agate mortar.

Example 2: Synthesis of a Bimetallic PBA

Synthesis of PBA(Co/Ni): Typically, cobalt acetate tetrahydrate ($Co(CH_3COO)_2 \cdot 6H_2O$, 0.6080 g, 2.4 mmol) and nickel acetate tetrahydrate ($Ni(CH_3COO)_2 \cdot 6H_2O$, 0.0609 g, 0.24 mmol) were dissolved in ethanol (40 ml) and water (40 ml). Then a solution of potassium hexacyanocobaltate (III) ($K_3Co(CN)_6$, 0.5488 g, 1.6 mmol) in water (40 ml) was added dropwise. The mixture was stirred at room temperature for 0.5 h and then was kept at room temperature for 24 h. The pink crystals were collected through centrifugation, and washed with water/ethanol (v./v.=2/1) for 3 times, before being vacuum dried at 80° C. overnight. After completely dried, the crystals in blue color were grinded manually in an agate mortar.

Example 3: Synthesis of a Trimetallic PBA

Synthesis of La-doped PBA(Co/Ni): Typically, cobalt acetate tetrahydrate ($Co(CH_3COO)_2 \cdot 6H_2O$, 0.6080 g, 2.4 mmol), nickel acetate tetrahydrate ($Ni(CH_3COO)_2 \cdot 6H_2O$, 0.0609 g, 0.24 mmol) and Lanthanum nitrate hexahydrate ($La(NO_3)_3 \cdot 6H_2O$, 0.1039 g, 0.24 mmol) were dissolved in ethanol (40 ml) and water (40 ml). Then a solution of potassium hexacyanocobaltate(III) ($K_3Co(CN)_6$, 0.5488 g, 1.6 mmol) in water (40 ml) was added dropwise. The mixture was stirred at room temperature for 0.5 h and then was kept at room temperature for 24 h. The pink crystals were collected through centrifugation, and washed with water/ethanol (v./v.=2/1) for 3 times, before being vacuum dried at 80° C. overnight. After completely dried, the crystals in blue color were grinded manually in an agate mortar.

Example 4: Integration of PBA and GC

Synthesis of PBA(Co)@graphene: Typically, PBA(Co) (0.3000 g) as synthesized in Example 1 was suspended with graphene (0.0096 g) in absolute ethanol (4 ml), followed by ultrasonication treatment for 2 hours. The mixture was transferred into a stainless steel ballmill jar with 10 quarter-inch stainless steel balls. The planetary ballmilling was conducted for 5 hours at 500 RPM to obtained a homogeneous slurry, before being dried at 80° C. until ethanol was completely gone. The resulting greyish powder was PBA (Co)@graphene.

Example 5: Synthesis of Group IV Metal Oxide-Coated PBA@GC

Synthesis of $TiO_2$-coated PBA(Co)@graphene: PBA(Co) @graphene as synthesized by the procedures described in Example 4 was coated by $TiO_2$ through atomic layer deposition. PBA(Co)@graphene powder was placed in ALD chamber with Ar as carrier gas. $TiO_2$ deposition were performed at the reactor temperature of 150° C. by using titanium isopropoxide ($Ti[OCH(CH_3)_2]_4$) as the precursors. Various cycles (such as 5, 10, 15, 30, 60) of the pulse sequence of $Ti[OCH(CH_3)_2]_4$—Ar—$H_2O$—Ar purge were used to control the $TiO_2$ thickness. After collected from ALD chamber, the sample was treated in air at 300° C. in a muffle furnace to further crystallize $TiO_2$.

Example 6: Convert Precursors to OER Catalyst for PEM Electrolyzer

The samples prepared according to the procedures described in Examples 1-5 was subjected to high temperature treatment. Generally, the precursor powder were loaded into a ceramic boat and pyrolyzed under air atmosphere in a tubular furnace at 320° C. for 2 hours to form Co oxide wrapped by graphene.

Catalyst Testing

Example 7: Electrocatalytic Activity Tests by RDE

The electrocatalytic activities of the OER catalysts for water splitting prepared according to Examples 1-6 were tested using the RDE technique in an acidic electrolyte. About 5 mg of each sample was dispersed into 1 ml of methanol mixed with 50 μl of 0.05% Nafion solution. The mixture was subjected to ultrasonication for 30 min to yield a homogenous ink. A certain amount of ink was transferred onto a GC electrode through micropipette, targeting a loading equivalent to 500 μg/cm$^2$ of the dry sample. The catalyst inks were tested using either 0.5 M $H_2SO_4$ or 0.1 M $HClO_4$ aqueous solution as the electrolyte with $Hg/Hg_2SO_4$ with saturated $K_2SO_4$ solution as reference electrode and a golden coil as counter electrode. All the potentials were referred to reversible hydrogen electrode ("RHE") for fair comparison, and the RHE calibration was done with the aid of a Hydro-Flex hydrogen electrode. Prior to each RDE measurement for OER, the catalyst was subjected to CV scans at 50 mV/s and then to linear sweep voltammetry scan at 10 mV/s from 1.2V to 2.0V vs. RHE.

Example 8: Electrocatalytic Activity Tests by Half-Cell

The electrocatalytic activities of the best OER catalysts for water splitting as tested in Example 7 was further evaluated using the half cell technique in an acidic electrolyte as this technique is more close to real electrolyzer test conditions than RDE. About 5 mg of each sample was dispersed into 166.7 μl of water/isopropanol (v./v.=1/1) mixed with 20.8 μl of 0.05% Nafion solution. The mixture was subjected to ultrasonication for 30 min to yield a homogenous ink. A certain amount of ink was transferred onto a platinum-coated titanium foil electrode through micropipette, targeting a loading equivalent to 4 mg/cm$^2$ of the dry sample. The catalyst inks were tested using either 0.5M H$_2$SO$_4$ or 0.1M HClO$_4$ aqueous solution as the electrolyte with Hg/Hg$_2$SO$_4$ with saturated K$_2$SO$_4$ solution as reference electrode and a golden coil as counter electrode. The RHE calibration was the same as described in Example 7. Prior to each RDE measurement for OER, the catalyst was subjected to CV scans at 50 mV/s and then to linear sweep voltammetry scan at 10 mV/s from 1.2V to 2.0V vs. RHE.

Example 9

Figure 9:
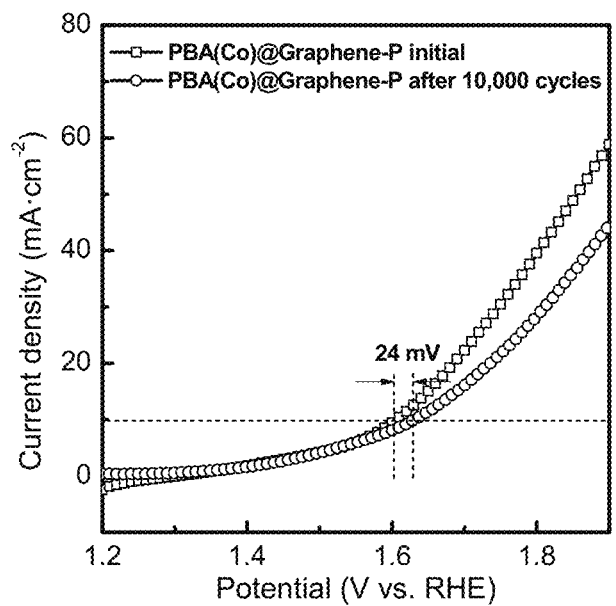
FIG. 9 is a graph of OER activity PBA(Co)@graphene-P before and after 10,000 CV cycles coated on gas diffusion layers measured in half cell with 0.1M $HClO_4$ electrolyte as the electrolyte.
Figure 10:
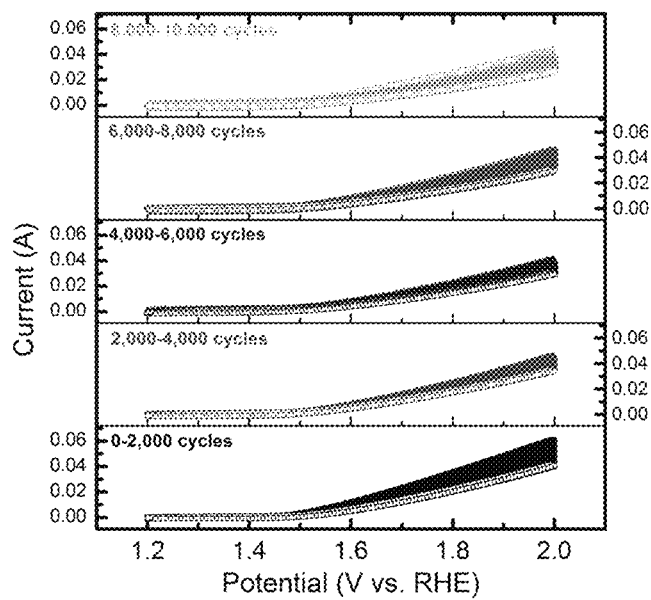
FIG. 10 is a graph of OER CV cycling for 10,000 times within 1.2-2.0V vs. RHE for low loading Ir black coated on gas diffusion layers measured in half cell with 0.1M $HClO_4$ as the electrolyte.

The monometallic PBA-derived OER catalyst prepared according to Example 6 was subjected to a durability test using half-cell in 0.5M H$_2$SO$_4$ electrolyte. In this test, the potential was polarized using cyclic voltammetry scan from 1.2-2.0V repeatedly in a multiple voltage cycling stress test. After 2,000, 4,000, 6,000, 8,000, 10,000 voltage cycles, the current-voltage polarization from 1.2V-2.0V was performed. FIG. 9 shows that only 0.024V voltage increase at the current density of 10 mA cm$^{-2}$ was observed between the first cycle and the 10,000$^{th}$ cycle, corroborating a relatively stable catalyst performance.

Example 10

Figure 11:
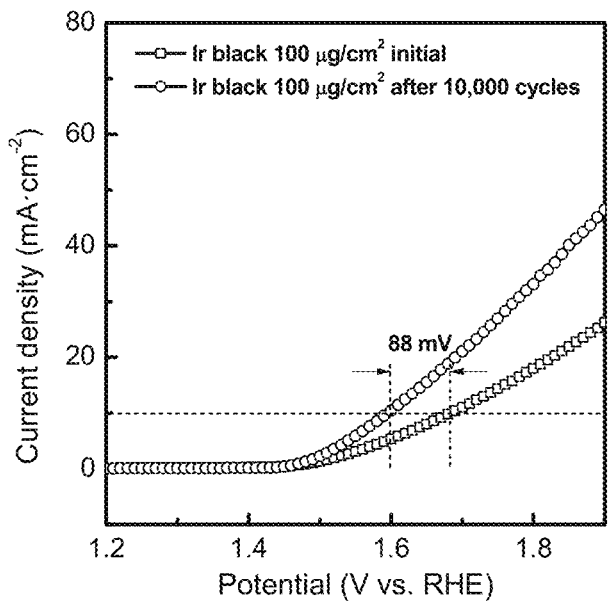
FIG. 11 is a graph of OER activity of low loading Ir black before and after 10,000 CV cycles coated on gas diffusion layers measured in half cell with 0.1M $HClO_4$ electrolyte as the electrolyte.

The commercial Ir black based precious metal catalysts were also subjected to the same durability test as described by Example 9. FIG. 11 shows that a 84 mV voltage drop were observed after the 10,000th cycle, indicating that the commercial Ir black benchmark are less stable than PBA-derived catalysts, which were demonstrated in Example 9.

Example 11: Electrocatalytic Activity Tests in PEM Electrolyzer

The electrocatalytic activities of the OER catalysts for water splitting prepared according to Examples 1-6 were tested in PEM electrolyzer. Prior to electrolyzer test, membrane electrode assembly ("MEA") was prepared. About 30 mg of each sample was dispersed into 1 ml of methanol mixed with a curtained amount of 0.05% Nafion solution. Catalyst/ionomer ratio was controlled to range from 5/1 to 1/1. The mixture was subjected to ultrasonication for 30 min to yield a homogenous ink. The ink was air-brushed onto 5 cm$^2$ area of proton exchange membrane (Nafion 115), which was attached onto a vacuum table heated to 60° C., targeting a loading equivalent to 4 mg/cm$^2$ of the dry sample. Ink containing commercial 20 wt % Pt/C was air-brushed on the other size of the membrane, serving as cathodic catalyst with a desirable loading of 0.5 mg/cm$^2$. The testing used a Fuel Cell Technologies ("FCT") cell hardware with 5 cm$^2$ as the active electrode area. The usual FCT carbon flow filed was exchanged to platinum-plated titanium flow field by considering the acidic and oxidative environments. After the MEA was loaded, water flow was started at a rate of 100 ccm, and the water and cell heaters were energized. Eletrolyzer cell was kept at 60° C.

Example 12

Figure 12:
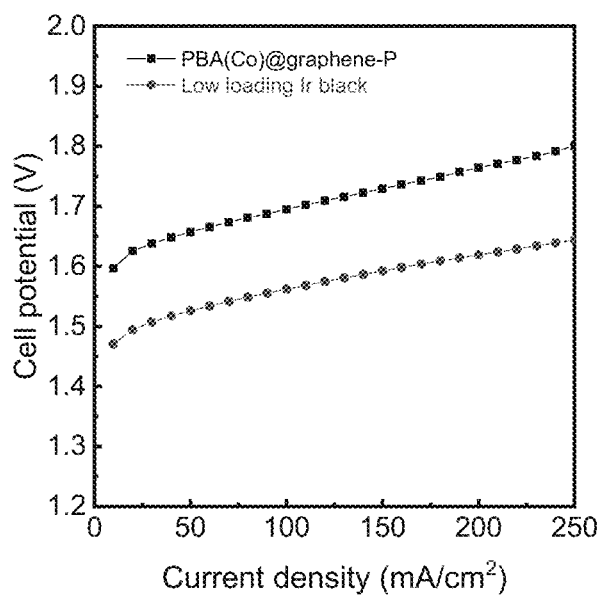
FIG. 12 shows PEM electrolyzer polarization comparison between PBA(Co)@graphene-P and low loading Ir black. Membrane: Nafion 115; Temperature: 60° C.
Figure 13:
FIG. 13 is a TEM image of PBA(Co).

The morphology of the PBA-based materials prepared according to Examples 1-6 was investigated by the transmission electron microscopy ("TEM"). FIG. 12 shows the 20-40 nm sized particles of monometallic PBA(Co). The small particle sizes benefit from precise control of solvothermal conditions.

Example 13

Figure 14:
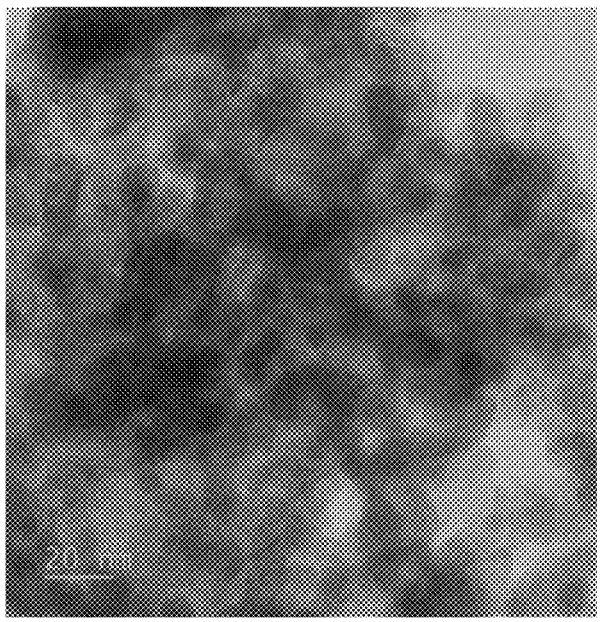
FIG. 14 is a TEM image of PBA(Co)-P (P=Pyrolysis).
Figure 15:
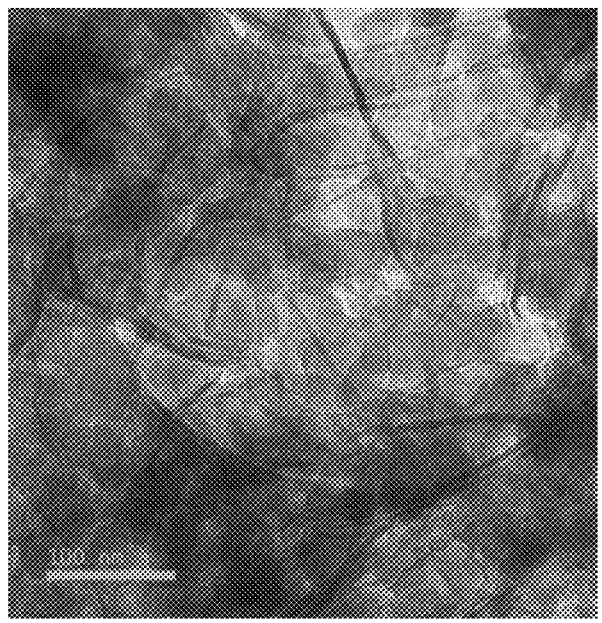
FIG. 15 is a TEM image of PBA(Co)@graphene.

The morphology of the PBA-derived nanomaterials after oxidation in air according to the Example 6 was investigated by the TEM. FIG. 14 shows the oxide particles with particle sizes inherited from monometallic PBA(Co).

Example 14

Figure 16:
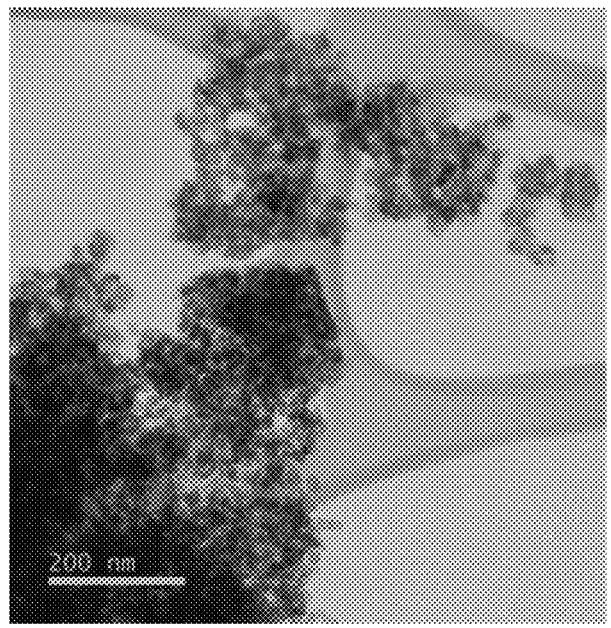
FIG. 16 is a TEM image of PBA(Co)@graphene-P (P=Pyrolysis).
Figure 17A:
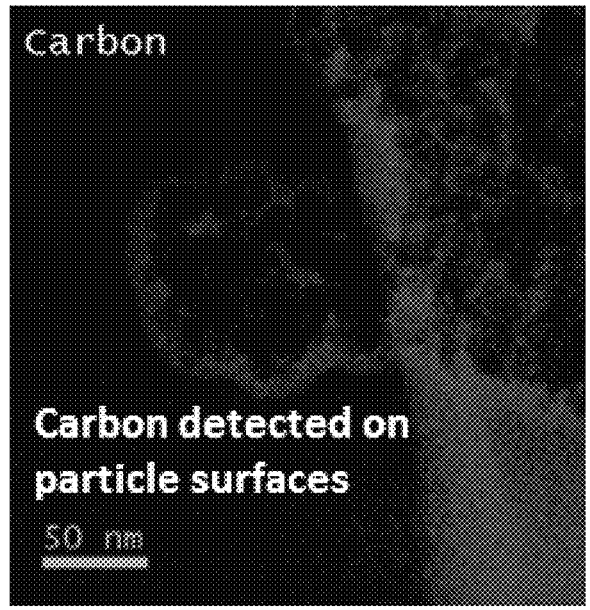
FIGS. 17A-B show Carbon elemental mapping image of PBA(Co)@graphene-P at higher magnification with carbon shown on particle surfaces (FIG. 17A) and at lower magnification with folds in the graphene visible (FIG. 17B).
Figure 17B:
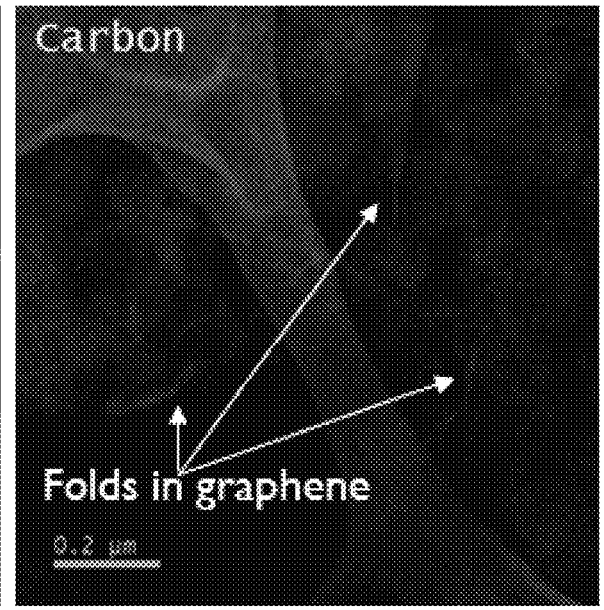
Figure 18:
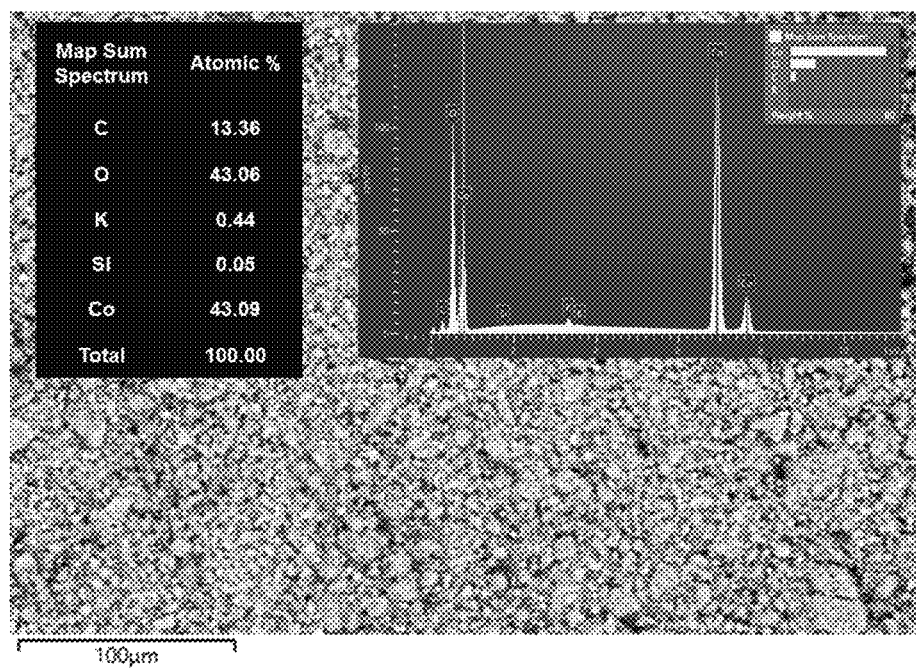
FIG. 18 is an SEM image of PBA(Co)@graphene-P (inset: EDS spectra and corresponding atomic elemental contents).

The morphology of the PBA@GC-derived nanomaterials after oxidation of PBA(Co)@graphene in air according to the Example 6 was investigated by the TEM. FIG. 16 shows the oxide particles that are wrapped by wrinkled graphene sheets. The carbon elemental mapping also provide information that carbon was detected on oxide particle surface, and the oxide particles are folded in graphene.

Example 15

Figure 19:
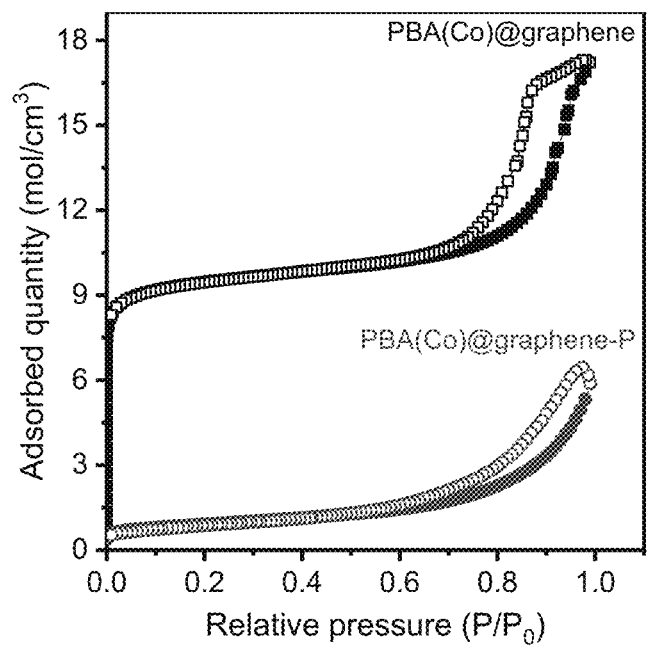
FIG. 19 is a graph of $N_2$ adsorption-desorption isotherms of PBA(Co)@graphene and PBA(Co)@graphene-P.
Figure 20:
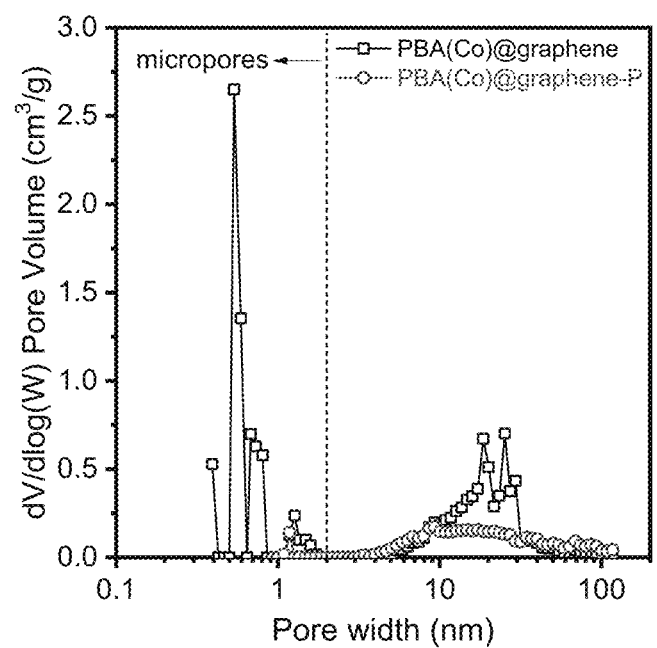
FIG. 20 is a graph of pore size distribution of PBA(Co) @graphene and PBA(Co)@graphene-P within 2-120 nm.

The specific surface areas of the PBA@GC samples before and after pyrolysis were also measured by BET method at the liquid nitrogen temperature. FIG. 19 shows Nitrogen adsorption isotherms measured at 77K using BET method for the catalyst samples prepared according to Example 1 and Example 6. FIG. 16 shows the pore size distributions calculated using non-linear DFT method over the nitrogen isotherm measurements for catalyst samples prepared according to Examples 4 and 6. Both samples show microporous and mesoporous nature. The hierarchical porosity aids in mass transport for OER electrocatalysis.

Figure 3:
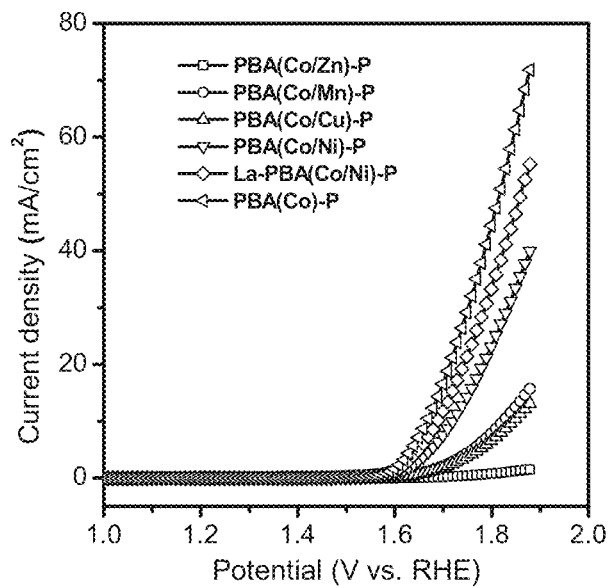
FIG. 3 is a graph of OER activity comparison between six PBA-derived PGM-free catalysts in 0.5 M $H_2SO_4$ electrolyte measured by rotating disk electrode ("RDE").
Figure 4:
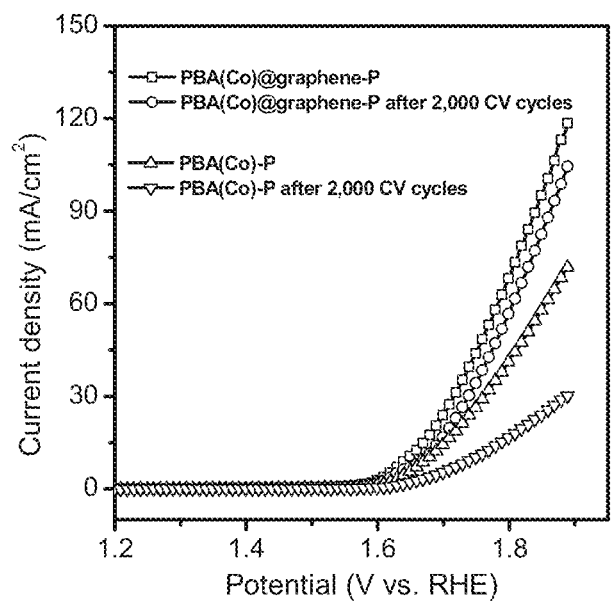
FIG. 4 is a graph showing OER activity comparison of PBA(Co)@graphene-P and PBA(Co)-P before and after 2,000 cyclic voltammetry ("CV") cycles in 0.5M $H_2SO_4$ electrolyte measured by RDE.
Figure 5:
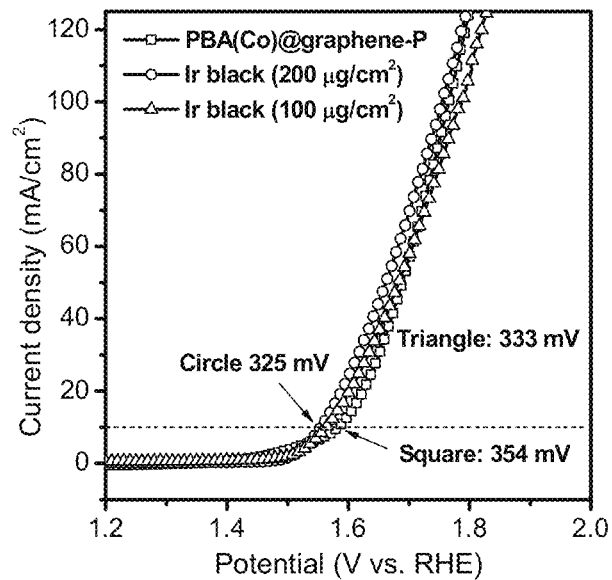
FIG. 5 is a graph showing an OER activity comparison of PBA(Co)@graphene-P and Ir black benchmark with different loadings coated on gas diffusion layers measured in half cell with 0.5M $H_2SO_4$ electrolyte as the electrolyte.
Figure 6:
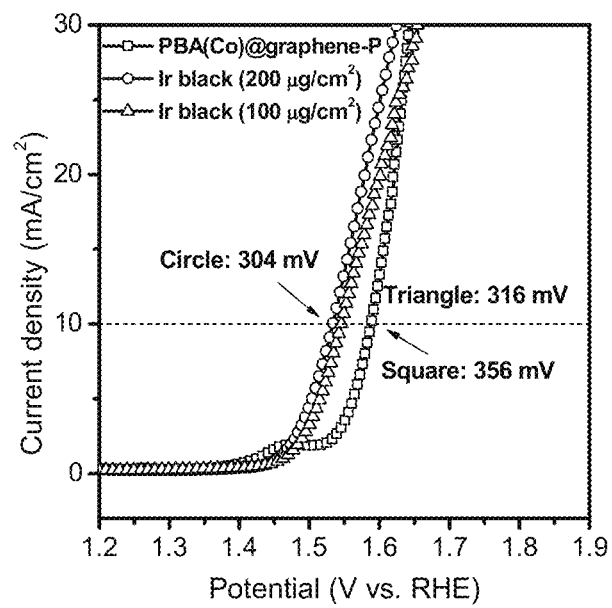
FIG. 6 is a graph of an OER activity comparison of PBA(Co)@graphene-P and Ir black benchmark with different loadings coated on gas diffusion layers measured in half cell with 0.1M KOH as the electrolyte.
Figure 7A:
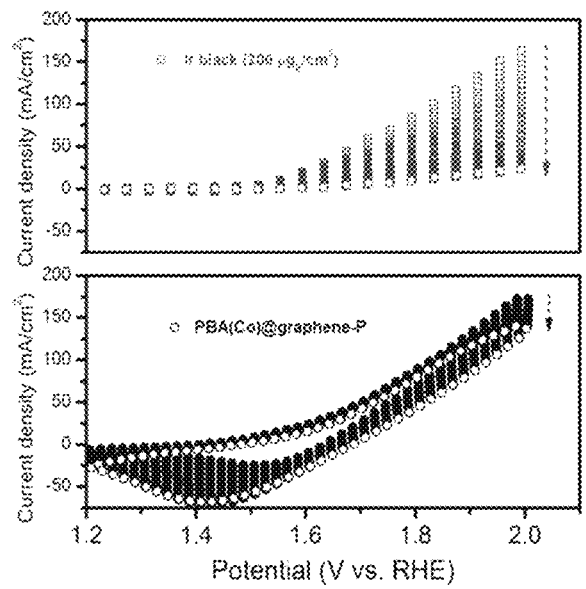
FIGS. 7A-B are OER comparisons of CV cycling for 2,000 times within 1.2-2.0V vs. RHE of PBA(Co)@graphene-P (FIG. 7A) and Ir black benchmark (FIG. 7B) coated on gas diffusion layers measured in half cell with 0.5M $H_2SO_4$ electrolyte as the electrolyte.
Figure 7B:
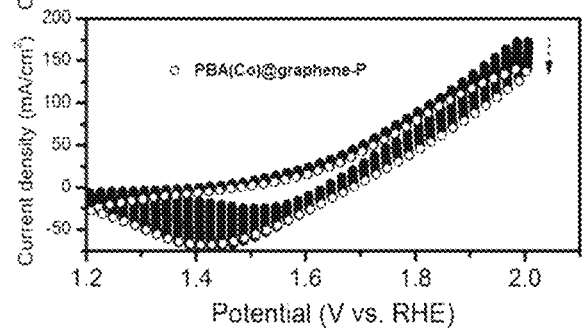
Figure 8:
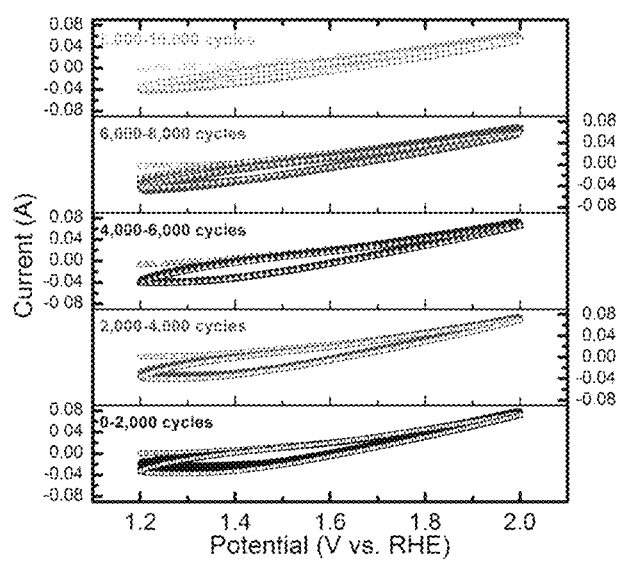
FIG. 8 is a graph of OER CV cycling for 10,000 times within 1.2-2.0V vs. RHE for PBA(Co)@graphene-Pcoated on gas diffusion layers measured in half cell with 0.1M $HClO_4$ as the electrolyte.

As shown in FIG. 3, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example. The instructions may include a plurality of sets of instructions. For example, in some implementations, the instructions may include instructions for applying radio frequency energy in a plurality of sequence blocks to a volume, where each of the sequence blocks includes at least a first stage. The instructions may further include instructions for repeating the first stage successively until magnetization at a beginning of each of the sequence blocks is stable, instructions for concatenating a plurality of imaging segments, which correspond to the plurality of sequence blocks, into a single continuous imaging segment, and instructions for encoding at least one relaxation parameter into the single continuous imaging segment.

System 100 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network ("LAN") and a wide area network ("WAN") that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

As used herein, the singular forms "a", "an," and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of making a catalyst material comprising:
   preparing Prussian blue analogue having at least one metal selected from the group consisting of cobalt, iron, manganese, nickel, copper, and zinc;
   mechanically processing the Prussian blue analogue with graphitized carbon in an organic solvent;
   forming a Prussian blue analogue and graphitized carbon material;
   applying a thermolysis treatment to the Prussian blue analogue and graphitized carbon material; and
   forming a Prussian blue analogue-derived metal oxide catalyst material.

2. The method of claim 1, wherein preparing the Prussian blue analogue comprises:
   dissolving a metal salt in a solution of water and alcohol forming a metal solution;
   adding an organic ligand solution comprising an organic ligand and an organic ligand solvent; and
   collecting the Prussian blue analogue.

3. The method of claim 1, wherein the at least one metal is at least two metals.

4. The method of claim 1, wherein the least one metal is at least three metals.

5. The method of claim 1, wherein the mechanical processing is by ballmilling or grinding.

6. The method of claim 1, wherein prior to mechanical processing the graphitic carbon is sonicated in the organic solvent.

7. The method of claim 1, wherein mechanical processing comprises a ratio between 50:1 to 1:1 of Prussian blue analogue to graphitized carbon.

8. The method of claim 5, wherein mechanical processing comprises a ratio between 30:1 to 15:1 of Prussian blue analogue to graphitized carbon.

9. The method of claim 1, wherein the thermolysis treatment is applied in an oxygen environment.

10. The method of claim 1, further comprising depositing a group IV metal oxide on the graphitized carbon after forming the Prussian blue analogue and graphitized carbon material and prior to thermolysis.

11. The method of claim 1, further comprising depositing a group IV metal oxide on the graphitized carbon after thermolysis.

12. The method of claim 1, wherein thermolysis occurs at 200° C. to 500° C.

13. A method of making a catalyst material comprising:
mechanically processing Prussian blue analogue comprising at least one metal with graphitized carbon in an organic solvent;
drying to form a Prussian blue analogue graphitized carbon material;
forming metal oxide on the Prussian blue analogue graphitized carbon material;
thermolyzing in an oxidizing environment; and
forming a Prussian blue analogue-derived metal oxide catalyst material having particle sizes of about 20-40 nm;
wherein the Prussian blue analogue-derived metal oxide catalyst material has a pore size of 2 nm to 50 nm and a BET surface area of 60-150 $m^2/g$.

14. The method of claim 13, wherein the at least one metal is at least two metals.

15. The method of claim 14, wherein the least one metal is at least three metals.

16. The method of claim 13, wherein the at least one metal is selected from the group consisting of cobalt, iron, manganese, nickel, copper, zinc, lanthanide, and actinide.

17. The method of claim 13, wherein forming the metal oxide comprising depositing a group IV metal oxide before thermolyzing.

18. The method of claim 13, further comprising depositing a group IV metal oxide on the graphitized carbon after thermolyzing.

19. The method of claim 13, wherein the Prussian blue analogue-derived metal oxide catalyst material comprises a graphitized carbon material coating on a Prussian blue analogue-derived core.

* * * * *